(12) United States Patent
Houldsworth

(10) Patent No.: US 7,308,466 B2
(45) Date of Patent: *Dec. 11, 2007

(54) MEMORY RECLAMATION METHOD

(75) Inventor: Richard J. Houldsworth, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 215 days.

This patent is subject to a terminal disclaimer.

(21) Appl. No.: 10/264,904

(22) Filed: Oct. 4, 2002

(65) Prior Publication Data

US 2003/0033320 A1 Feb. 13, 2003

Related U.S. Application Data

(63) Continuation of application No. 09/533,485, filed on Mar. 23, 2000, now Pat. No. 6,487,563.

(30) Foreign Application Priority Data

Mar. 23, 1999 (GB) .................................. 9906629.2

(51) Int. Cl.
G06F 17/30 (2006.01)
(52) U.S. Cl. ...................................... 707/206; 707/200
(58) Field of Classification Search ................ 707/206, 707/1–205
See application file for complete search history.

(56) References Cited

U.S. PATENT DOCUMENTS 5,485,613 A * 1/1996 Engelstad et al. .......... 707/206
5,535,390 A * 7/1996 Hildebrandt ................ 711/154
5,848,423 A * 12/1998 Ebrahim et al. ............ 707/206
5,857,207 A * 1/1999 Lo et al. ..................... 707/203

(Continued)

FOREIGN PATENT DOCUMENTS

WO WO9919802 4/1999

OTHER PUBLICATIONS

Jones et al., "Garbage Collection: Algorithms for Automatic Dynamic Memory Management", pp. 1-18.

(Continued)

*Primary Examiner*—Cam Linh Nguyen

(57) ABSTRACT

A method of reclaiming memory space allocated to a data structure comprising data objects (910-960) linked by identifying pointers, in which the memory allocated to data objects is reclaimed using two systems: a first system (980), by which a selected part of the data structure is traversed by following the pointers, one of at least two identifiers being allocated to the data objects, a first identifier which indicates that the data object has been traversed so that the data objects referenced by the pointers of that data object have been identified, and a second identifier which indicates that the data object is referenced by a pointer, but the data object has not yet been traversed; and a second system (990), by which an individual data object is selected for deletion to enable the associated memory space to be reclaimed. The second system (990) reads the first system identifier for the individual data object, and if the first identifier is present deletes the data object thereby reclaiming the associated memory space. If the second identifier is present, it allocates a third identifier, where the first system (980) operates to reclaim the memory space allocated to data objects having the third identifier.

9 Claims, 5 Drawing Sheets

U.S. PATENT DOCUMENTS

| | | | | |
|---|---|---|---|---|
| 5,903,899 A | * | 5/1999 | Steele, Jr. | 707/206 |
| 6,098,089 A | * | 8/2000 | O'Connor et al. | 718/104 |
| 6,308,185 B1 | * | 10/2001 | Grarup et al. | 707/206 |
| 6,317,756 B1 | * | 11/2001 | Kolodner et al. | 707/206 |

OTHER PUBLICATIONS

Paul R. Wilson, "Uniprocessor Garbage Collection Techniques", Proc. Of International Workshop on Memory Management, St. Malo, France, Sep. 1992.

* cited by examiner

MEMORY RECLAMATION METHOD

CROSS REFERENCE TO RELATED APPLICATIONS

This is a continuation of application Ser. No. 09/533,485, filed Mar. 23, 2000 now U.S. Pat. No. 6,487,563.

The present invention relates to a memory reclamation method, in particular one in which conflicting deletion attempts for a stored data object may be made.

Garbage collection is the automated reclamation of system memory space after its last use by a programme. A number of examples of garbage collecting techniques are discussed in "Garbage Collection—Algorithms for Automatic Dynamic Memory Management" by R. Jones et al, pub. John Wiley & Sons 1996, ISBN 0-471-94148-4, at pages 1 to 18, and "Uniprocessor Garbage Collection Techniques" by P. R. Wilson, Proceedings of the 1992 International Workshop on Memory Management, St. Malo, France, September 1992. Whilst the storage requirements of many computer programs are simple and predictable, with memory allocation and recovery being handled by the programmer or a compiler, there is a trend toward functional languages having more complex patterns of execution such that the lifetimes of particular data structures can no longer be determined prior to run-time and hence automated reclamation of this storage, as the program runs, is essential.

A common feature of a number of garbage collection reclamation techniques, as described in the above-mentioned Wilson reference, is incrementally traversing the data structure formed by referencing pointers carried by separately stored data objects. The technique involves first marking all stored objects that are still reachable by other stored objects or from external locations by tracing a path or paths through the pointers linking data objects.

This may be followed by sweeping or compacting the memory—that is to say examining every object stored in the memory to determine the unmarked objects whose space may then be reclaimed.

Normally, the garbage collection and reclamation process runs on the computer in parallel to a program process, the garbage collection and reclamation process operating on the heap (memory area) occupied by data objects of the program process, so that garbage from the program process can be detected as soon as possible and the appropriate resources reclaimed. A result of the two processes running in parallel to each other and operating the same memory area is that they could both be operating on the same data objects at the same time. In the event of only a single processing thread being available to the two processes, steps from the garbage collection and reclamation process are interleaved with steps of the program process. A single step of the garbage collection and reclamation process may not necessarily completely process a data object and those data objects that it has pointers referenced to.

Many computer programming languages offer functions for manual reclamation of memory used by data objects. As opposed to automatic garbage collection, to manually reclaim memory used by a data object a programmer must explicitly execute an appropriate function from within the program that created the data object. Indeed, a popular feature of Object-Oriented programming languages such as C++ is the ability to define a destructor method for an object class. A destructor method is a function written by a programmer specifically for an object class. The default operation performed by a destructor method is to delete the object it is associated with from the heap. The programmer can include calls to other functions from within a destructor method so that when the destructor method is executed for a data object created from the object class, resources held by the data object can be reclaimed, such as file handles and other objects referenced by pointers from the object, before the data object is automatically deleted from the computer's memory heap. This method is particularly popular for reclamation of linked list and tree data structures where destructors for each object in the linked list can be recursively called until the end of the list is reached, thereby reclaiming the whole linked list from a single destructor method call. In this manner, a programmer, knowing that a program has finished with a data object, could execute the destructor method from the program so that the object and its resources can be reclaimed in an orderly fashion as soon as the object is finished with.

It will be apparent, however, that such manual memory reclamation methods conflict with the garbage collection and reclamation methods described above. If a garbage collection and reclamation process is part way through processing a series of linked data objects, when the program process manually reclaims the resources held by the data objects, the next time the garbage collection and reclamation process resumes, it will attempt to process a data object that no longer exists resulting in an error state being generated and potentially a system failure.

In Java (® Sun Microsystems Inc.) virtual machines there is no provision for manual memory reclamation methods. All memory reclamation must be performed by an automatic garbage collector. However, as Java (® Sun Microsystems Inc.) supports multiple processing and different garbage collection mechanisms have different strengths and weaknesses (for example reference counting can quickly identify 0-referenced data objects as garbage but cannot identify cyclic data structures as garbage, whilst the mark-sweep algorithm can identify most types of garbage but takes much longer to identify it), it is desirable that a number of automatic garbage collectors operate concurrently on the heap occupied by data objects. In order for garbage collectors to operate concurrently they must have some conflict resolution mechanism in the event that one garbage collector tries to reclaim a data object that another garbage collector is currently processing.

Before arriving at the solution of the present invention, a number of other possible solutions were explored. Data objects that are currently being processed by the garbage collection and reclamation process can be marked such that before a manual reclamation operation, or the data object being processed by another garbage collection and reclamation process, a mark is checked for and the operation can be aborted if the data object is found to be marked. However, by aborting the operation, reclamation of the resources held by the data object becomes reliant on the garbage collection and reclamation process recognising them as garbage and reclaiming them in the future—this reclamation may be at some indefinite time in the future or, if the program process is permanently running and keeps a valid pointer referencing the data object, the data object may never be recognised as garbage and would therefore never be reclaimed.

Alternatively the garbage collection and reclamation process could place a mutual exclusion lock (by a method such as semaphores) on the data object(s) it is processing. Such a lock, however, prevents the program process from accessing and manipulating the data objects and would at least halt the execution of the program process at the point it requires access to the data object(s) until the lock(s) are released and could cause the program process to fail.

According to the present invention, there is provided a method of reclaiming memory space allocated to a data structure comprising data objects linked by identifying pointers, in which the memory allocated to data objects is reclaimed using two systems:

a first system, by which a selected part of the data structure is traversed by following the pointers, one of at least two identifiers being allocated to the data objects, a first identifier which indicates that the data object has been traversed so that the data objects referenced by the pointers of that data object have been identified, and a second identifier which indicates that the data object is referenced by a pointer, but the data object has not yet been traversed; and a second system, by which an individual data object is selected for deletion to enable the associated memory space to be reclaimed, wherein the second system reads the first system identifier for the individual data object, and if the first identifier is present deletes the data object thereby reclaiming the associated memory space, and if the second identifier is present, allocates a third identifier, and wherein the first system operates to reclaim the memory space allocated to data objects having the third identifier.

An advantage of the present invention is that the second system does not delete the data object if the first system has not finished traversing it, but adds a marker so that deletion will only take place when the first system is ready.

Preferably, the first system comprises an automatic garbage collection system. The invention thus eliminates the conflict between automatic garbage collection and manual memory reclamation. Preferably, the first system also operates to reclaim the memory space allocated to data objects having no identifier. The second system may be the manual deletion of data objects. This may be in the form of the deletion of data objects by a creating program of the objects when the objects are no longer needed. Alternatively and preferably, the second system comprises an automatic garbage collection system. The invention thus eliminates the conflict between the two automatic garbage collection systems. Preferably, the second system also reclaims memory space allocated to data objects referenced by pointers from the data object having the third identifier.

The invention also provides a data processing apparatus for implementing the method of the invention.

The invention will now be described by way of example only, with reference to the accompanying drawings, in which.

Figure 1:
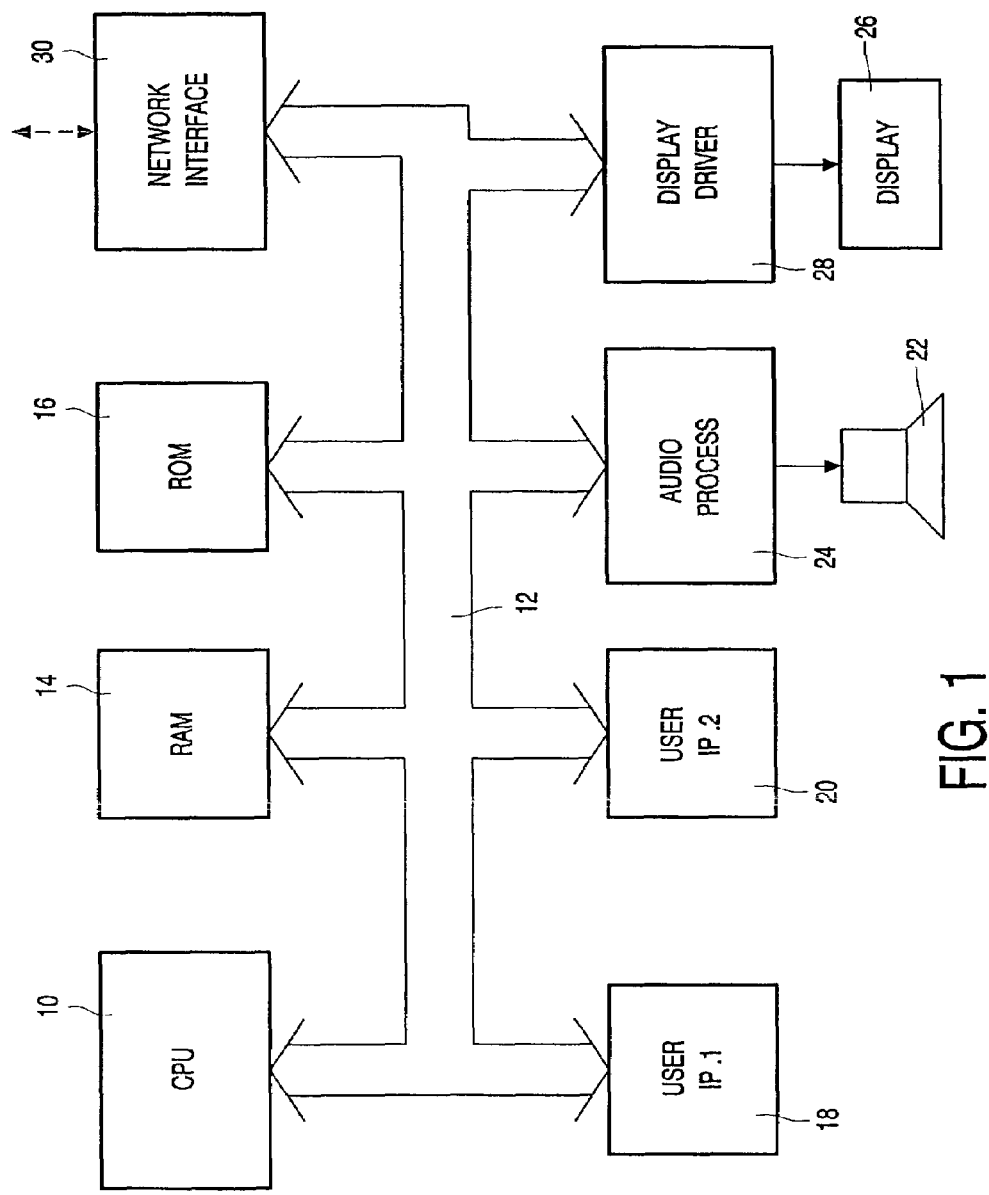
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment. The system comprises a central processing unit (CPU) 10 coupled via an address and data bus 12 to random-access (RAM) and read-only (ROM) memories 14, 16. These memories may be comprised of one or several integrated circuit devices and may be augmented by a system hard-disk as well as means to read from additional (removable) memory devices, such as a CD-ROM. The present invention is particularly embodied in memory management for a working area of the RAM 14 under control of the CPU 10; a controlling program for this may initially be held in ROM 16 and loaded up with the operating system on power-up. Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10. A further source of data for the system is via online link to remote sites, for example via the Internet, to which end the system is provided with a network interface 30 coupled to the bus 12.

Figure 2:
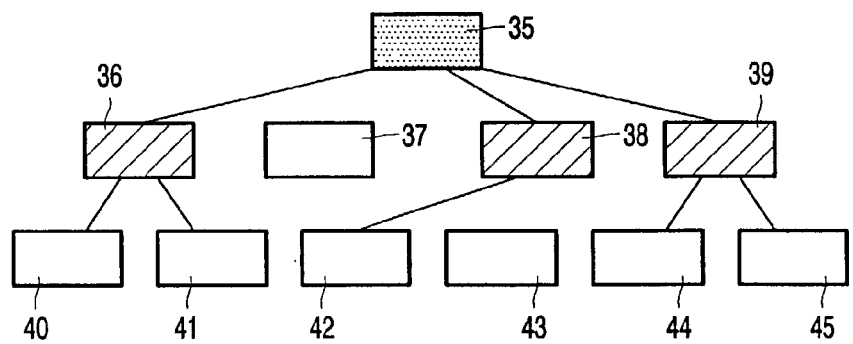
FIGS. 2 to 4 represent a group of partially linked data objects as tracing proceeds, using a tricolour marking scheme.
Figure 3:
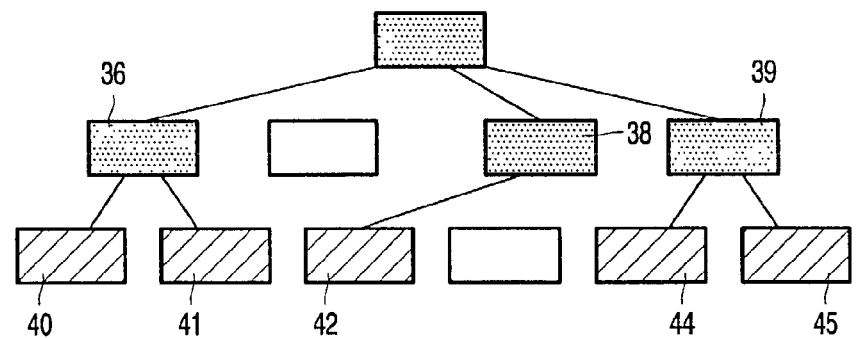
Figure 4:
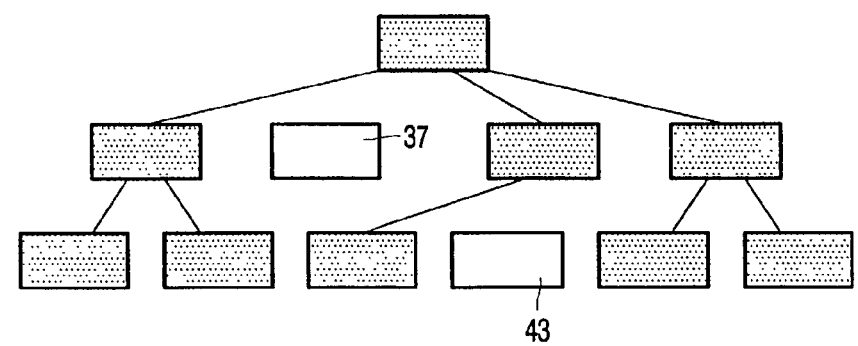

FIGS. 2 to 4 schematically illustrate the basic principles of tracing in incremental garbage collecting using a tricolour marking scheme, the terminology of which will be used in the following examples. A particular feature of incremental collectors is that the procedure is not carried out contiguously but in discrete steps interspersed with periods of program execution to avoid introducing lengthy breaks to the execution. The tricolour scheme is a convenient method to describe the process of marking as it spreads through the "network" formed by memory objects linked by pointers. In the scheme, objects which have been reached and passed by the traversal process (i.e. the traversal has reached all linked immediate descendants) are coloured black; those objects reached by the traversal whose actual or potential descendants have not been reached are coloured grey, and all other objects are coloured white.

In the partially-linked collection of objects of FIGS. 2 to 4, FIG. 2 shows the status after the first incremental stage of the tracing procedure starting from object 35 and spreading outwards/downwards, with object 35 marked black and the three objects 36,38,39 to which it carries pointers being marked grey. FIG. 3 represents the status after a further incremental stage with the descendant objects 40,41,42,44, 45 of objects 36,38,39 having been reached by the traversal and accordingly marked grey. As all their descendants have been reached, objects 36,38,39 are marked black at this stage. FIG. 4 represents the final stage at which it has been determined that there are no remaining linked objects, and objects 40,41,42,44,45 are marked black. This concludes the mark phase and shows that there are two "unreachable" objects 37,43 to which there are no pointers. These objects are still marked white, indicating them to be garbage and thus available for deletion.

The tricolour marking scheme is discussed in greater detail in the previously cited Wilson reference including various techniques for handling the incremental nature of the procedure, where the layout of the data structure may change during traversal, with the interspersed segments of program execution shifting the arrangement of placed pointers. One particular point to note is that the hierarchical layout of objects in FIGS. 2 to 4 is purely for the purposes of illustration: in actuality, the objects may be spread throughout the available memory with the hierarchy only determined by the arrangement of linking pointers.

Figure 5:
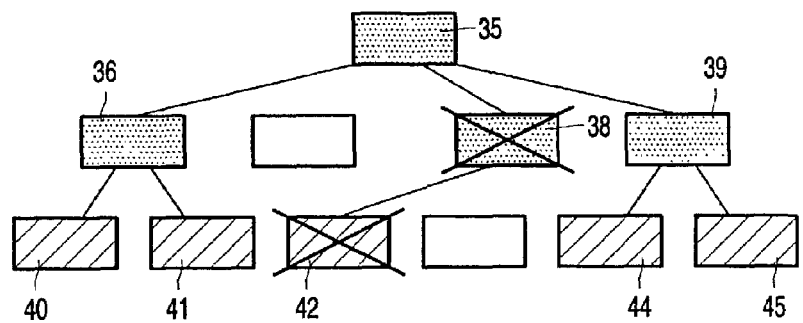
FIG. 5 represents the group of partially linked data objects of FIG. 3 including a data object for which a deletion attempt conflicting with a garbage collection process has been made.

The problem of conflicting deletion attempts is explained with reference to FIG. 5 which represents the group of partially linked data objects of FIG. 3. The incremental garbage collector has processed data objects 35, 36, 38 and 39 and has references to data objects 40, 41, 42, 44 and 45 which are due to be processed when the garbage collector next resumes. However, between the garbage collector processing data object 38 and data object 42, a process external to the garbage collector executes a destructor operation for data object 38, which in turn executes a destructor operation for data object 42. When the garbage collector subsequently resumes and follows its reference to what it expects to be a data object it may find no data object at all in which case an error condition is generated, alternatively the process external to the garbage collector may have created another data object in the memory area previously occupied by data object 42, in which case the garbage collector will incorrectly believe that the new data object is linked to data object 38 and in turn to data object 35.

Figure 6:
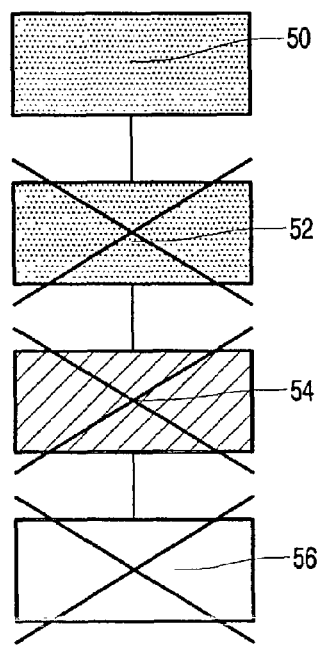
FIGS. 6 and 7 represents a data object for which a deletion is processed by a method of reclaiming memory space embodying the present invention.

The method of reclaiming memory space embodying the present invention is explained with reference to FIG. 6. A program has created in the heap data object 50 linked to descendent data object 52 which is in turn linked to descendent data object 54 which is linked to data object 56. The program uses the data objects 50-56 to store its data and subsequently manipulates the objects and stored data during its execution. In this example the garbage collector has processed data objects 50 and 52 and is due to process data object 54 when it next resumes. During its period of execution, the program determines that data object 52 and its descendants are no longer needed and executes the destructor method for data object 52 which has been written to recursively call the destructor for each of its descendants. To the extent described above this is conventional in the art.

The present invention effectively modifies known manual memory reclamation operations, such as destructor methods, to make them compatible with automatic garbage collection. The modified destructor method determines the marking status of data object 52 from a data field of the object. On finding the status to be black, the destructor recursively calls the destructor for each descendant data object, in this case data object 54. The destructor for data object 54 determines its marking status to be grey, indicating a conflict between the destructor and the garbage collector. The destructor for data object 54 therefore, instead of deleting the data object 54, changes the marking status of the data object 54 to red, indicating a request to delete the object. The destructor for data object 54 then recursively calls the destructor for data object 56 which, determining the marking status of data object 56 to be white, deletes the data object 56 and returns to the destructor for data object 54. This destructor in turn ends its execution returning to the destructor for data object 52 which ends by deleting data object 52 from the heap. If all the data objects had a black or white marking status, there would have been no conflict and the data objects could have all been recursively deleted. Instead, data object 54 remains, with a red marking status.

Figure 7:
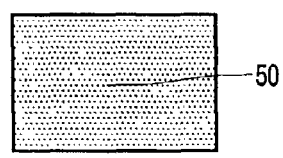
Figure 7:
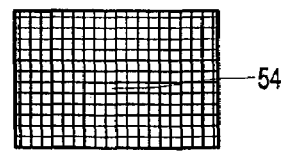

The garbage collector resumes its marking of the data objects shown in FIG. 7. When processing each referenced data object, its respective marking status is checked. Upon processing data object 54, the garbage collector finds its status to be red. In the same way as the status of data objects marked grey are changed to black when their descendent data objects are processed, data objects marked red are changed to white. This is performed as an atomic test-and-set operation (if (state=red) then state=white). The data object is then reclaimed with other garbage during the reclamation phase of the garbage collection.

In a preferred embodiment of the present invention, any red status objects processed by the garbage collector during the marking phase are immediately deleted by the garbage collector without waiting for the reclamation phase.

The operation of destructors or other manual reclamation functions embodying features of the present invention will depend on the structures of data objects they are written for reclaiming. For example, if a data object is the descendant of two parent data objects (such as where the data objects are linked in a cyclic structure), only one of which is deleted, or requested to be deleted, it may be desired that the data object is not deleted in which case the manual reclamation function for the parent data objects would be written without code recursively calling for the manual reclamation of the descendant data object. Indeed, it may be preferable that only the highest level data object is deleted or marked red, indicating a request for deletion, so that the automatic garbage collector recognizes the orphaned descendants as garbage on its next mark phase through the memory heap.

In a further example of manual reclamation embodying features of the present invention, when a data object is marked red indicating a deletion request conflicting with garbage collection, the red mark is propagated down the tree or list to any other descendants of the red marked data object.

Figure 8:
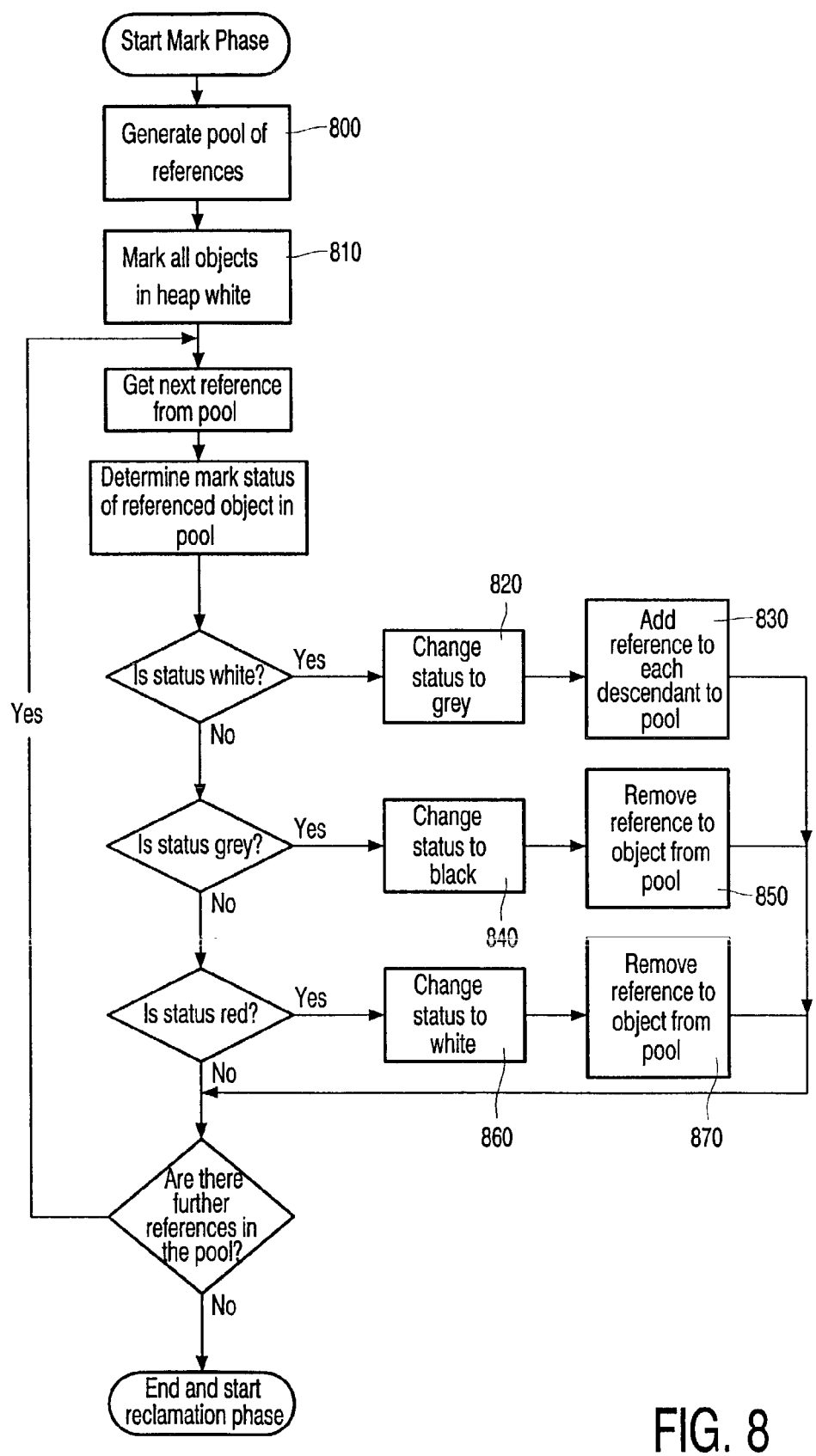
FIG. 8 is a flow chart describing features of a method of reclaiming memory space embodying the present invention.

FIG. 8 is a flowchart describing features of the method of the present invention. In step 800, a program that has created a number of data objects in the form of data structures on the heap, some of which it no longer uses, is interrogated to obtain a reference to each top level (root) data object for data structures it is currently using. These references are stored in a pool. As will be understood from the following description, the pool is used to store data objects being processed by the garbage collector—references are added to and removed from the pool as the garbage collector traverses the data structures. During the processing according to the method of the present invention, references to descendant data objects will be added to the pool and, as each data object is completely processed its respective reference is removed from the pool. The marking status of all data objects in the heap is made white in step 810. For each data object referenced in the pool, if its marking status is found to be white, it is changed to grey in step 820 and a reference to each, if any, descendent data object is added to the pool in step 830. The reference to the data object is kept in the pool so that it is subsequently processed again. If the marking status of a data object is found to be grey, it is changed to black in step 840 and the reference to that data object is removed from the pool in step 850. If the marking status of a data object is found to be red, it is changed to white in step 860 and the reference to the data object is removed from the pool in step 870. As discussed previously with reference to FIGS. 6 and 7, an object can only be assigned a red marking status by a manual deletion operation conflicting with a grey marking status. The change of marking status from grey to red is performed during the manual deletion operation.

In this manner, once all references to data objects in the pool are exhausted, all data objects in the heap will have a marking status of black, if they are linked to a root data object held by the program and have not been requested to be deleted, or white otherwise. The subsequent reclamation phase of the garbage collection may then reclaim memory held by data objects having a white marking status by a method such as sweeping, compaction etc.

It will be apparent to the skilled person that the deletion request mechanism of the present invention may be implemented in a number of ways dependent on the programming language and compiler used.

For those Object-Oriented languages permitting the use of destructor methods, the deletion of a data object is automatic once its destructor method has been called. In order to implement the present invention in this case, the compiler could be modified so that destructor methods could be aborted if a red marking of an object is found. Alternatively, it may be permitted to include a finaliser method within destructors able to resurrect data objects in which case the finaliser can resurrect the data object if a red marking of that data object is found.

For less sophisticated languages, allowing delete or de-allocation functions to be used on data objects, the programmer could write an appropriate function which checks the marking status of a data object before deleting or de-allocating it.

Other operations performed by deletion functions or destructor methods, such as recursive deletion of lists or trees would be dependent on the programmer calling the appropriate operations from the respective function.

Figure 9:
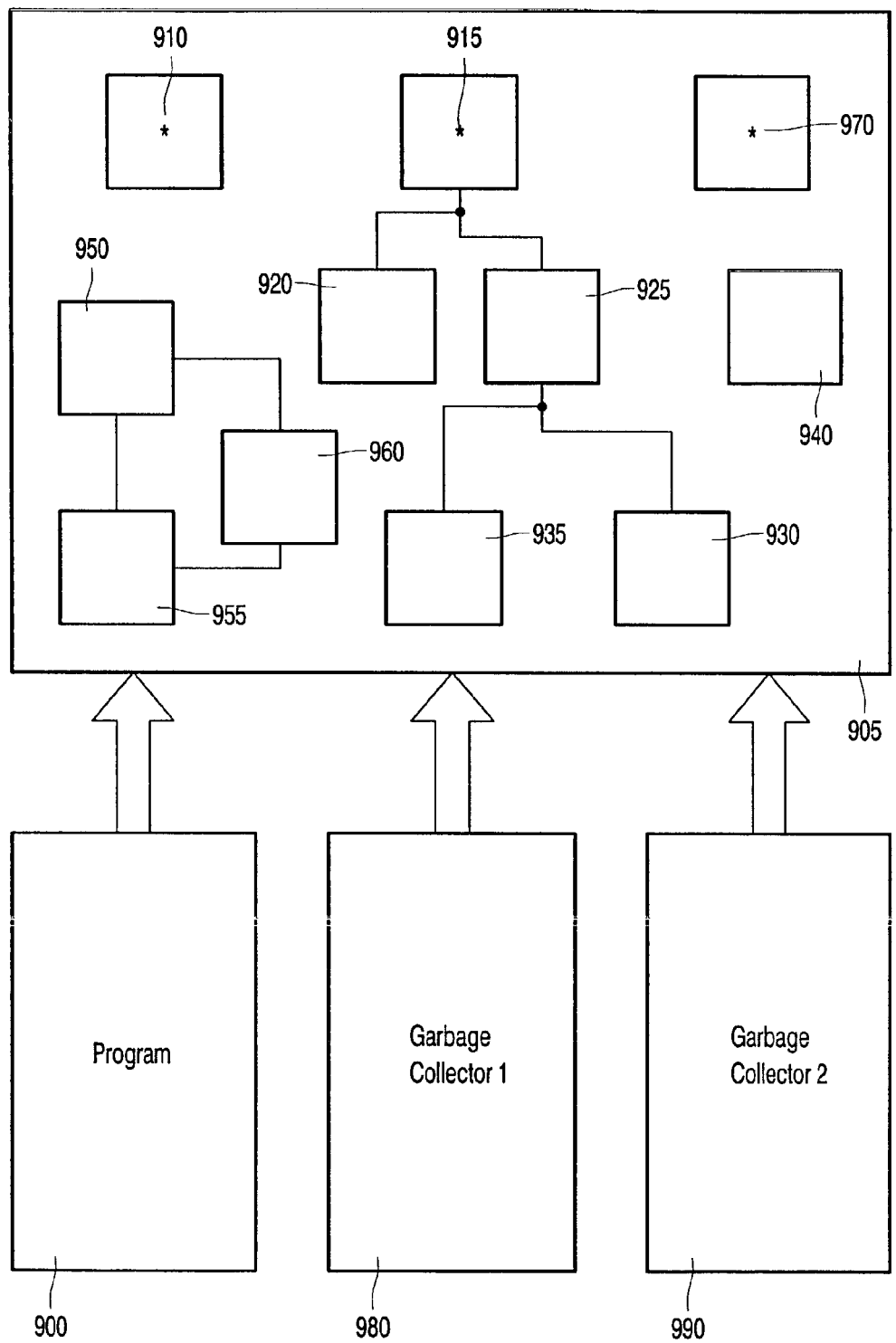
FIG. 9 represents a group of partially linked data objects processed by a program, a first garbage collection process and a second garbage collection process embodying the present invention.

FIG. 9 represents a group of partially linked data objects processed by a program, a first garbage collection process and a second garbage collection process emodying the present invention. A Java (® Sun Microsystems Inc.) virtual machine has a program process 900 running in a first thread. The program process 900 has created a number of data objects 910-960 on the heap 905. Some of the data objects are linked together by pointers to form tree 915-935 and list 950-960 data structures. The program process accesses the data objects via root data objects 910, 915 and 970. Those data objects not reachable from the root data objects, such as objects 940 and 950-960 are no longer accessible to the program process and are therefore garbage. A first garbage collection process 980, running in a second thread, is operating on the heap. The garbage collection process 980 uses a reference-count algorithm to detect and delete unreferenced data objects. A second garbage collection process 990, running in a third thread, is also operating on the heap. The garbage collection process 990 uses a mark-sweep algorithm, as has been previously described with reference to FIG. 8 to detect and reclaim garbage. On processing the heap, the first garbage collection process 980 detects and attempts to delete unreferenced data object 940. However, the second garbage collection process 990 is currently processing this object (and has therefore marked it grey). The first garbage collection process detects the grey marking of the data object and, instead of deleting it, changes the marking status to red. The second garbage collection process 990 then continues, as has been described with reference to FIG. 8 whilst the first garbage collection process 980 would delete the red marked data object when it resumes, as has been previously described.

Although defined principally in terms of a software implementation, the skilled reader will be well aware that the above-described functional features could equally well be implemented in hardware, or in a combination of software and hardware.

From reading the present disclosure, other modifications will be apparent to persons skilled in the art. Such modifications may involve other features which are already known in the design, manufacture and use of data processing and storage apparatus and devices and component parts thereof and which may be used instead of or in addition to features already described herein.

The invention claimed is:

1. A program stored on a machine readable medium for reclaiming memory space allocated to a data structure of data objects linked by identifying pointers, in which the memory allocated to data objects is reclaimed using two processes, the programming comprising:

a software portion of a first process under control of a processor, for traversing a selected part of the data structure by following the pointers, allocating a first identifier which indicates that a data object has been traversed so that the data objects referenced by the pointers of that data object have been identified, allocating a second identifier which indicates that a given data object is referenced by a pointer, but the given data object has not yet been traversed, and reclaiming the memory space allocated to any data objects having a third identifier; and a software portion of a second process under control of a processor, for reading the identifier for individual data objects;

deleting the data object thereby reclaiming the associated memory space if the first identifier is present;

allocating the third identifier if the second identifier is present.

2. The program of claim 1, wherein the first process comprises an automatic garbage collection process.

3. The program of claim 2, wherein the second process is another automatic garbage collection process.

4. The program of claim 1, wherein the first process comprises the acts of reclaiming the memory space allocated to data objects having no identifier.

5. The program of claim 1, wherein the deleting act comprises a manual deletion of data objects process.

6. The program of claim 1, wherein the second process comprises a portion of a creating program of the objects when the objects are no longer needed.

7. The program of claim 1, wherein the first process comprises the act of reclaiming memory space allocated to data objects referenced by pointers having the third identifier.

8. The program of claim 1, wherein the second process is executing substantially independent of the first process.

9. The program of claim 1, wherein the second process is executing substantially in parallel with the first process.

* * * * *